US006657315B1

United States Patent
Peters et al.

(10) Patent No.: US 6,657,315 B1
(45) Date of Patent: Dec. 2, 2003

(54) METHOD OF OPERATING A HYBRID ELECTRIC VEHICLE TO REDUCE EMISSIONS

(75) Inventors: Mark William Peters, Wolverine Lake, MI (US); David Lee Boggs, Bloomfield Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 09/645,950

(22) Filed: Aug. 25, 2000

(51) Int. Cl.[7] ................................................ B60L 11/14
(52) U.S. Cl. .................................. 290/40 C; 180/65.2
(58) Field of Search ...................... 290/40 C; 180/65.2, 180/65.3, 65.4

(56) References Cited

U.S. PATENT DOCUMENTS

| 4,021,677 A | * | 5/1977 | Rosen et al. ............... 180/65.2 |
| 5,318,142 A | | 6/1994 | Bates et al. ............... 180/65.2 |
| 5,323,868 A | * | 6/1994 | Kawashima ......... 123/142.5 E |
| 5,327,991 A | * | 7/1994 | Yoshida ..................... 180/65.4 |
| 5,588,498 A | * | 12/1996 | Kitada ................... 123/179.18 |
| 5,785,137 A | * | 7/1998 | Reuyl ........................ 180/65.2 |
| 5,826,671 A | | 10/1998 | Nakae et al. ............... 180/65.2 |
| 6,057,605 A | * | 5/2000 | Bourne et al. ............ 290/40 A |
| 6,059,057 A | * | 5/2000 | Yamazaki et al. .......... 180/309 |
| 6,195,985 B1 | * | 3/2001 | del Re et al. ........ 123/DIG. 11 |
| 6,301,529 B1 | * | 10/2001 | Itoyama et al. ............ 180/65.2 |
| 6,305,347 B1 | * | 10/2001 | Russell ....................... 123/295 |
| 6,327,852 B1 | * | 12/2001 | Hirose ....................... 180/65.4 |
| 6,330,498 B2 | * | 12/2001 | Tamagawa et al. ........ 180/65.2 |
| 6,367,570 B1 | * | 4/2002 | Long et al. ................. 180/65.2 |

FOREIGN PATENT DOCUMENTS

| EP | 0511654 A2 | * | 4/1992 |
| FR | 2784626 A1 | * | 4/2000 |

* cited by examiner

*Primary Examiner*—Joseph Waks
(74) *Attorney, Agent, or Firm*—Brooks Kushman P.C.; Carlos L. Hanze

(57) ABSTRACT

A method of operating a hybrid electric vehicle 10 to reduce emissions. The method utilizes the vehicle's electric motor/generator 12 to generate a negative torque during cold-start conditions, effective to increase the load on the internal combustion engine 16, thereby reducing the light-off time of the catalytic converter 28. The method also reduces emissions by utilizing the vehicle's motor/generator 12 to provide a supplemental torque to engine 16 during transient events, thereby reducing the generated mass flow and amount of untreated emissions.

3 Claims, 6 Drawing Sheets

METHOD OF OPERATING A HYBRID ELECTRIC VEHICLE TO REDUCE EMISSIONS

FIELD OF THE INVENTION

This invention relates to a method of operating a hybrid electric vehicle to reduce tailpipe emissions and more particularly, to a method of operating a hybrid electric vehicle which utilizes the vehicle's electric motor/generator to reduce emissions during cold-start and transient conditions.

BACKGROUND OF THE INVENTION

Conventional vehicles having internal combustion engines utilize a three-way-catalyst ("TWC") to reduce tailpipe emissions. Particularly, the TWC catalytically reduces nitrogen oxides (NOx) and oxidizes carbon monoxide ("CO") and unburned hydrocarbons ("HC") which are produced during the combustion process. The TWC has a very high conversion efficiency once the catalyst has "warmed up" and the air-fuel ratio of the mixture is near its stoichiometric point. An example of the conversion efficiency of a typical catalytic converter over time is shown in graph 100 of FIG. 5.

In conventional vehicles, more than fifty percent (50%) of the HC and CO emissions are generated in the first sixty seconds of a standard emissions test cycle (e.g., the EPA75 test cycle), and more than twenty five percent (25%) of the NOx emissions are generated during that time. An example of the tailpipe emissions of a vehicle during a standard emissions test is shown in graph 110 of FIG. 6. The point in time at which the catalytic converter reaches a fifty percent (50%) efficiency is commonly referred to as its "light-off" time. Due to the relatively poor efficiency of the catalytic converter prior to "light-off", recent efforts to reduce tailpipe emissions have concentrated on reducing the "light-off" time, thereby reducing the time during which the catalytic converter is least efficient. These prior efforts have also included concomitantly altering the air-fuel ratio and/or retarding the spark calibration of the engine.

These prior efforts have suffered from some drawbacks. Particularly, the difficulty in controlling the combustion stability of the engine and the operating load of the engine as it warms up severely limits these prior strategies. Moreover, although significant fractions of the emissions are produced during "cold start" type conditions (e.g., during the first sixty seconds of vehicle operation), periods when engine operating loads are changing rapidly or "transient events" also produce a significant portion of the emissions, specifically NOx emissions (see e.g., FIG. 6). Hence, these methods which concentrate on cold-start type operating conditions do not adequately address or improve emissions during transient events once the vehicle has warmed up.

Hybrid electric vehicles have been designed and manufactured for the purpose of improving fuel economy and emissions. Particularly, hybrid electric vehicles utilize both an internal combustion engine and one or more electric motors to generate power and torque. The electric motor(s) within a hybrid electric vehicle provides the vehicle with additional degrees of freedom in delivering power and torque. While hybrid electric vehicles significantly reduce emissions, the foregoing emissions reducing strategies are not well-suited for use with hybrid electric vehicles. Particularly, the foregoing emissions reducing strategies do not maximize and/or utilize the flexibility of hybrid electric vehicles to utilize both an electric motor and an internal combustion engine to provide power and torque.

There is therefore a need for a method of operating a hybrid electric vehicle to reduce emissions which overcomes the drawbacks of prior emissions reducing methods, strategies and systems.

SUMMARY OF THE INVENTION

It is a first object of the invention to provide a method of operating a hybrid electric vehicle to reduce emissions which overcomes at least some of the previously delineated drawbacks of prior emissions reducing methods and strategies.

It is a second object of the invention to provide a method of operating a hybrid electric vehicle which utilizes the vehicle's motor/generator to selectively increase and reduce the power output of the internal combustion engine to reduce emissions.

It is a third object of the invention to provide a method of operating a hybrid electric vehicle to reduce emissions which utilizes the vehicle's electric motor/generator to reduce the light-off time of the catalytic converter.

It is a fourth object of the invention to provide a method of operating a hybrid electric vehicle which reduces emissions by utilizing the vehicle's motor to reduce the load changes experienced by the vehicle's internal combustion engine during transient events.

According to a first aspect of the present invention, a method is provided for reducing emissions of a hybrid electric vehicle of the type having a drive train, an electric machine which selectively provides torque to the drive train, an engine which selectively provides torque to the drive train and which operates at a certain power output, and a catalytic converter which receives exhaust gas from the engine and which operates at a certain efficiency based upon temperature. The method includes the steps of detecting a cold-start condition; and selectively providing a negative torque to the drive train during the cold-start condition by use of the electric machine, the negative torque being effective to increase the power output of the engine and the temperature of the catalytic converter, thereby increasing the efficiency of the catalytic converter and reducing emissions.

According to a second aspect of the present invention, a method is provided for reducing emissions of a hybrid electric vehicle of the type having a drive train, an electric machine which selectively provides torque to the drive train, an engine which selectively provides torque to the drive train and which operates at a certain power output, and a catalytic converter which receives exhaust gas from the engine. The method includes the steps of detecting a transient event; and selectively providing a positive torque to the drive train by use of the electric machine, the positive torque being effective to supplement the torque provided by the engine and lower the certain power output, thereby lowering exhaust mass flow through the catalytic converter and reducing emissions.

These and other features, aspects, and advantages of the invention will become apparent by reading the following specification and by reference to the following drawings.

DETAILED DESCRIPTION OF THE PREFERRED EMBODIMENT OF THE INVENTION

Figure 1:
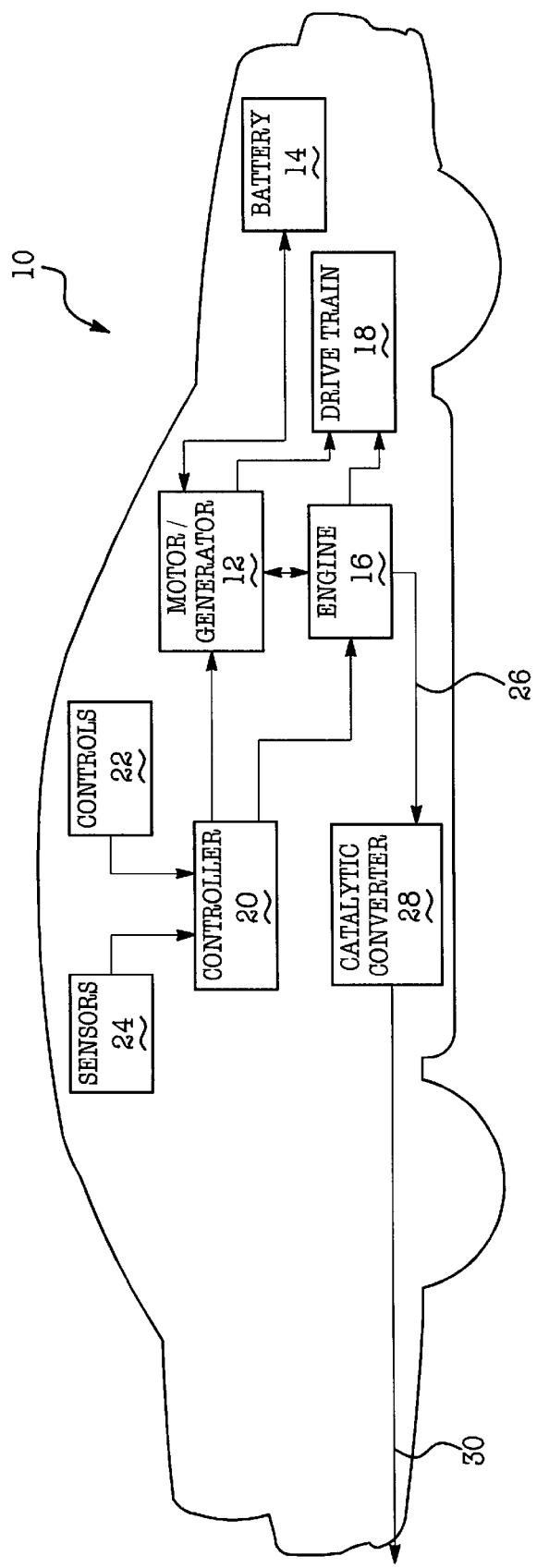
FIG. 1 is a block diagram of a hybrid electric vehicle which employs an emissions reducing strategy which is performed in accordance with the teachings of a preferred embodiment of the present invention.

Referring now to FIG. 1, there is shown an automotive hybrid electric vehicle ("HEV") 10 which utilizes a method or strategy for reducing emissions which is performed in accordance with the teachings of the preferred embodiment of the present invention. Vehicle 10 includes an electric machine or motor/generator 12, which is operatively coupled to a conventional electrical energy storage device 14 (e.g., a battery, fuel cell or other electrical energy storage device), and an internal combustion engine 16. Motor/generator 12 and engine 16 are each selectively and operatively coupled to the vehicle's driveline or drive train 18 (e.g., to the drive shaft(s) of the vehicle) and cooperatively deliver power and torque to the drive train 18, thereby powering the vehicle 10. A control system or controller 20 is electrically and communicatively coupled to motor 12, engine 16, conventional user or driver operated controls or components 22, and conventional vehicle operating condition sensors 24. Controller 20 receives signals and/or commands generated by controls 22 and sensors 24, and processes and utilizes the received signals to determine the amount of torque which is to be provided to the vehicle's drive train 18 and to selectively cause motor/generator 12 and engine 16 to cooperatively provide the desired torque to the drive train 18.

In the preferred embodiment of the invention, electric machine 12 is a conventional electric motor/generator unit which is adapted for use in a hybrid electric vehicle. Electric motor/generator 12 is operatively coupled to the drive shaft (not shown) of the vehicle 10 in a known and conventional manner. In alternate embodiments, motor/generator 12 is operatively and conventionally coupled to other portions of the drive train or drive line 18 of the vehicle 10 (e.g., to one or more of the axles or differential gear units of vehicle 10), and to other mechanical components of vehicle 10. In other alternate embodiments, motor/generator 12 may comprise several communicatively coupled motors and/or generators. Motor/generator 12 selectively provides torque to the drive shaft or drive train 18 of vehicle 10, thereby selectively powering vehicle 10. Importantly, motor/generator 12 is further operatively coupled to the engine 16 in a conventional manner (e.g., to the output shaft of the engine 16 by use of a planetary gear set) which allows motor/generator 12 to be selectively coupled to the engine 16 without transferring power to the drive train 18. Electric motor/generator 12 also functions as a generator to convert drive train energy or engine-produced energy into electrical energy which is used to electrically power various electrical components of vehicle 10. Particularly, motor/generator 12 may perform a "regenerative braking" type function, in which motor/generator 12 selectively applies a negative torque to the drive train 18 and/or to the output shaft of engine 16, thereby converting the vehicle's and/or engine's kinetic energy into electrical energy. Electrical charge storage device 14 supplies power to motor/generator 12 and can further be used to recover and store electrical energy during regenerative events. While the following description is made with reference to the motor/generator 12, it should be appreciated that other types of electric machines or motor/generators may be used in combination with the engine 16 to deliver torque to the drive train 18 and to reduce the emissions of vehicle 10.

In alternate embodiments, motor/generator 12 may comprise a pair of motor/generators arranged in a conventional "dual-split" or "power-split" type hybrid configuration. Particularly, in such alternate embodiments, the engine (e.g., engine 16) and the pair of motor/generators are interconnected by use of a conventional planetary gear set or system, which is operatively coupled to and transfers torque and power to the vehicle's drive train 18 (e.g., to the vehicle's drive shaft).

Engine 16 is a conventional multi-cylinder internal combustion engine which may include several cylinders (e.g., four, six, eight, or more cylinders). Engine 16 is operatively coupled to drive train 18 and selectively delivers torque and power to drive train 18 in a known and conventional manner. Engine 16 is coupled to a conventional exhaust line or system 26 which includes a conventional catalytic converter 28. Exhaust system 26 transfers and/or communicates the burnt exhaust gasses resulting from the internal combustion of engine 16 through catalytic converter 28, which treats the exhaust gasses and removes undesirable emissions before the gasses are discharged into the atmosphere through tailpipe or exhaust conduit 30.

In the preferred embodiment, controller 20 includes several microprocessors or microcontrollers as well as other chips and integrated circuits which cooperatively control the operation of vehicle 10. Controller 20 may comprise one or more commercially available, conventional, and disparate chips or devices, which are operatively and communicatively linked in a cooperative manner. Controller 20 includes permanent and temporary memory units, which are adapted to and do store at least a portion of the operating software which directs the operation of controller 20. Particularly, controller 20 includes conventional software, hardware and/or firmware of the type which is used to control an HEV motor/generator, and of the type which is used to provide control to an internal combustion engine. As described more fully and completely below, controller 20 is effective to determine the total amount of torque which is to be provided or delivered to drive train 18 by motor 12 and engine 16, and/or the amount of torque which is to be provided or delivered to engine 16 by motor/generator 12. Controller 20 is further adapted to selectively alter the spark timing and fuel metering (i.e., the air-fuel ratio) of engine 16.

Driver operated controls 22 comprise a plurality of conventional and commercially available switches, devices and other components which accept user or driver selected inputs, thereby allowing the user or driver to operate vehicle 10. Controls 22 provide commands and/or operating data to controller 20 which utilizes these commands or data to determine the amount of torque which is to be delivered by vehicle 10 and to selectively cause motor 12 and engine 16 to cooperatively provide the desired torque.

Sensors 24 comprise a plurality of conventional and commercially available sensors which measure and/or acquire information pertaining to the motor 12, electrical charge storage device 14, engine 16 and vehicle 10 (e.g., vehicle operating condition data). In the preferred embodiment of the invention, sensors 24 include one or more conventional vehicle and/or engine speed sensors and one or more sensors adapted to estimate and/or determine the speed and/or load of engine 16, the temperature of engine 16 and/or catalytic converter 28, how long the engine 16 has been operating, whether the engine 16 is in a "cold start" type condition, whether the engine 16 is experiencing transient type events. Sensors 24 generate one or more signals to controller 18 based upon these measured and/or estimated values. Particularly, sensors 24 provide vehicle operating data to control system 18 which utilizes this data to determine the amount of torque which is to be delivered to drive train 18 and/or engine 16.

Figure 2:
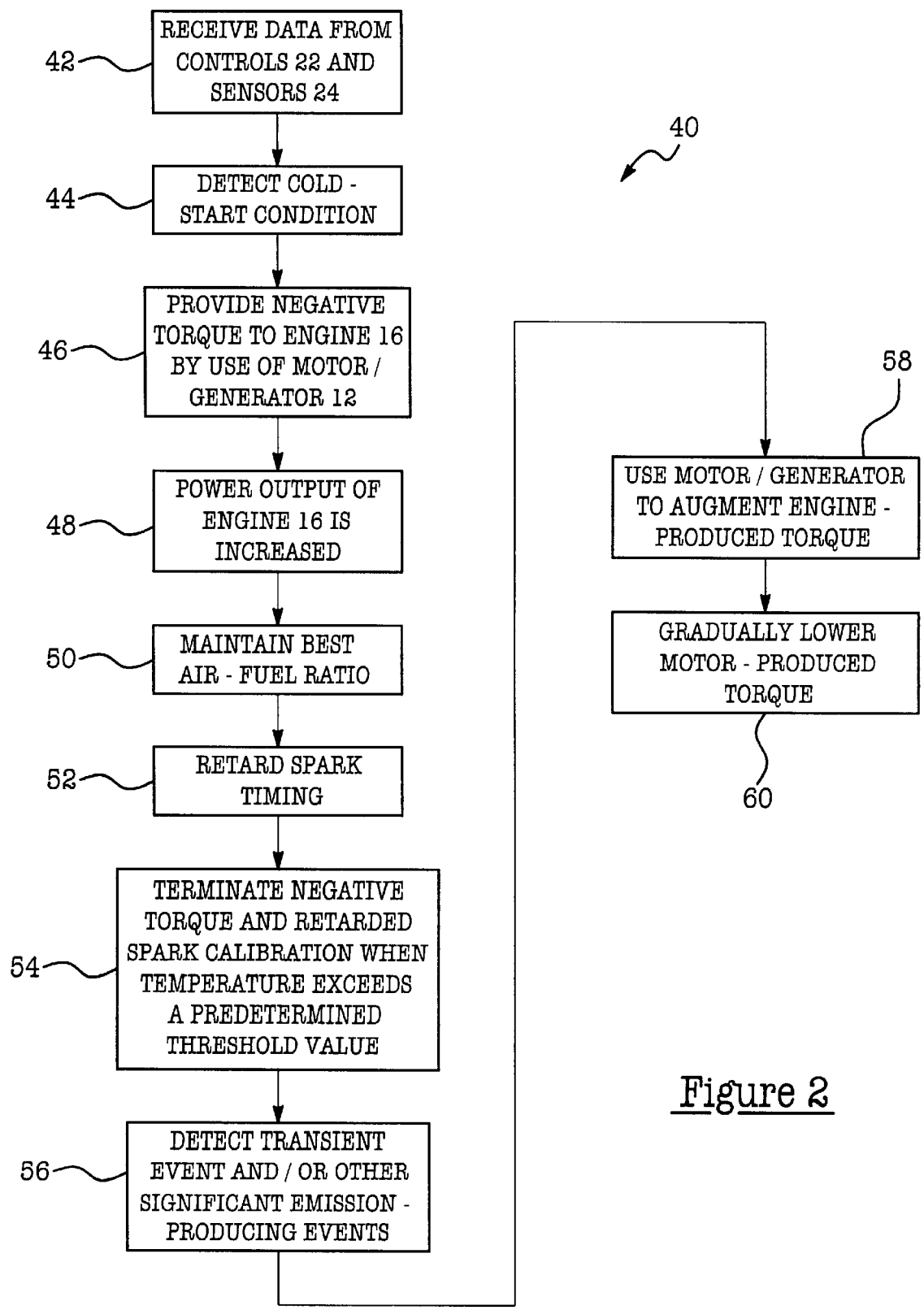
FIG. 2 is a block diagram illustrating a method of operating the hybrid electric vehicle shown in FIG. 1 in a manner which reduces exhaust emissions and which is performed in accordance with the teachings of the preferred embodiment of the present invention.

Referring now to FIG. 2, there is shown a preferred embodiment of a method 40 for reducing the emissions of hybrid electric vehicle 10. Method 40 begins with step 42, where controller 20 receives commands, data, and/or signals from driver operated controls 22 and from vehicle sensors 24. Based upon this received data, controller 20 detects whether a "cold-start" condition exists, as shown in step 44. Particularly, controller 20 will detect a cold-start condition if engine 16 has just been started and/or has a relatively cold temperature (e.g., when the sensed temperature of engine 16 falls below a certain predetermined threshold value).

Upon detecting a cold-start condition, controller 20 proceeds to step 46, where the controller 20 sends a signal to motor/generator 12 to provide a negative torque to engine 16. Controller 20 causes motor/generator 12 to act as a generator and provide a "regenerative" or negative torque to the engine 16 and/or to drive train 18, thereby increasing the load on engine 16. The electrical energy produced by this "regenerative" torque is supplied to battery 14. In one alternate embodiment, controller 20 first verifies that battery 14 is not fully charged prior to commanding motor/generator 12 to produce the regenerative torque. The precise value of the negative torque provided by motor/generator 12 may be varied in a conventional manner and may be based upon the temperature of the engine 16 and/or catalytic converter 28, the size and torque output of the engine 16, and other vehicle specific attributes or characteristics.

As shown in step 48, the negative torque produced by motor/generator 12 causes the power output and load of engine 16 to increase to meet the vehicle's torque demands. As the engine output and load increase, the "heat flux" transferred to the catalytic converter 28 is concomitantly increased. As used herein, the term "heat flux" represents the exhaust mass flow rate multiplied by the exhaust gas thermal energy. This intentional or "artificial" increase in the engine load created by the negative torque of motor/generator 12 and in the exhaust gas heat flux rapidly heats the catalyst, thereby providing a reduced "light-off" time for the catalyst and a corresponding decrease in total exhaust emissions.

Figure 3A:
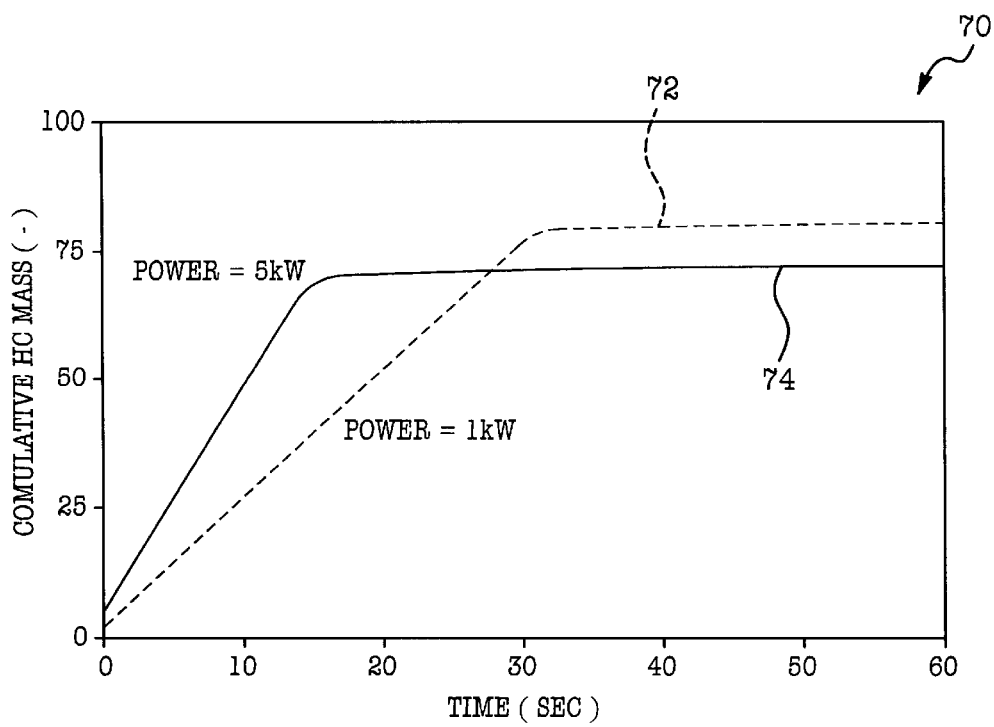
FIGS. 3a and 3b are graphs illustrating the improved exhaust gas emission performance for cold start conditions which is achieved by the preferred method shown in FIG. 2.
Figure 3B:
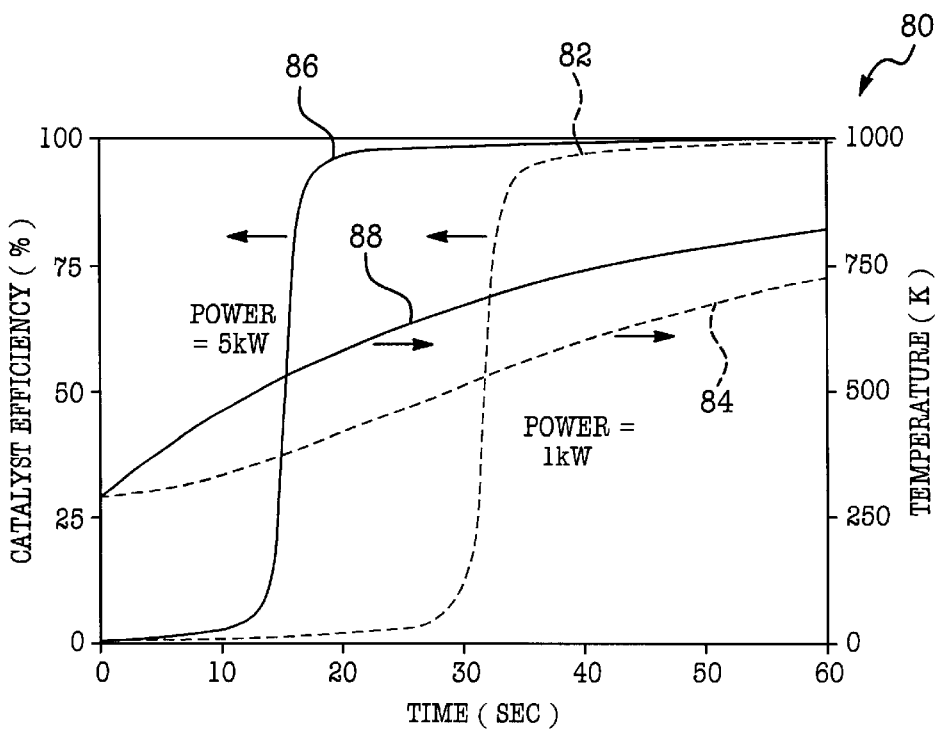

The reduced emissions and catalyst "light-off" time provided by the present method 40 are illustrated in graphs 70 and 80 of FIGS. 3a and 3b. Graph 70 of FIG. 3a illustrates non-limiting examples of the hydrocarbon ("HC") emissions of a vehicle employing the foregoing method. Graph 70 includes a curve 72 representing the HC emissions over time when the negative torque power output of motor/generator 12 is approximately one kilowatt; and a curve 74 representing the HC emissions over time when the negative torque power output of motor/generator 12 is approximately five kilowatts. Graph 80 of FIG. 3b illustrates non-limiting examples of the catalyst efficiency and temperature which is achieved using the foregoing method. Graph 80 includes curves 82 and 84, which respectively represent the catalyst efficiency and catalyst temperature over time when the negative torque power output of motor/generator 12 is approximately one kilowatt; and curves 86 and 88, which respectively represent the catalyst efficiency and catalyst temperature over time when the negative torque power output of motor/generator 12 is approximately five kilowatts. As shown, catalyst "light-off" and a relatively high catalyst efficiency can be reached relatively quickly by use of the negative torque provided by motor/generator 12.

Figure 4:
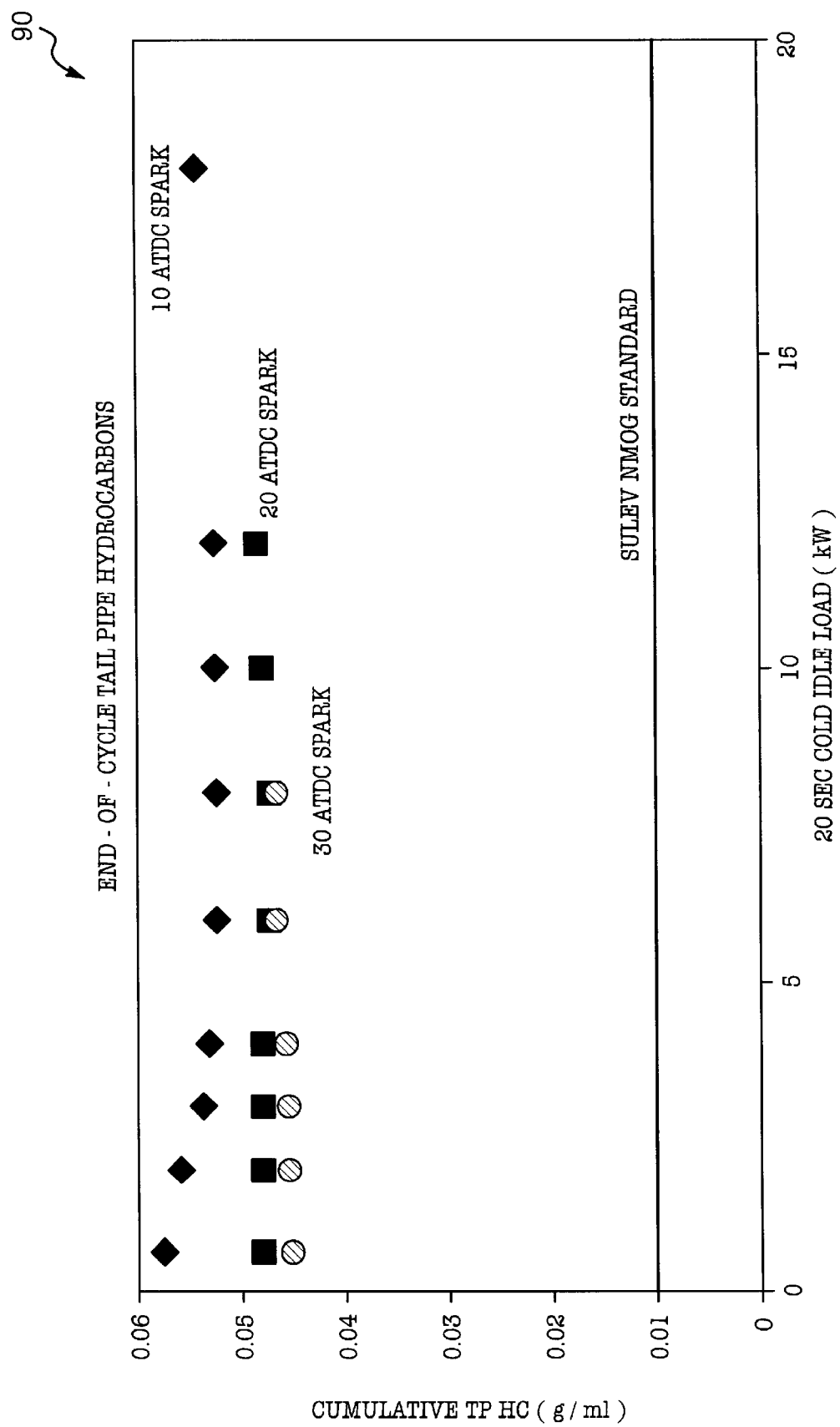
FIG. 4 is a graph illustrating the improved hydrocarbon emissions achieved by the method shown in FIG. 2 for varying degrees of spark retardation.
Figure 5:
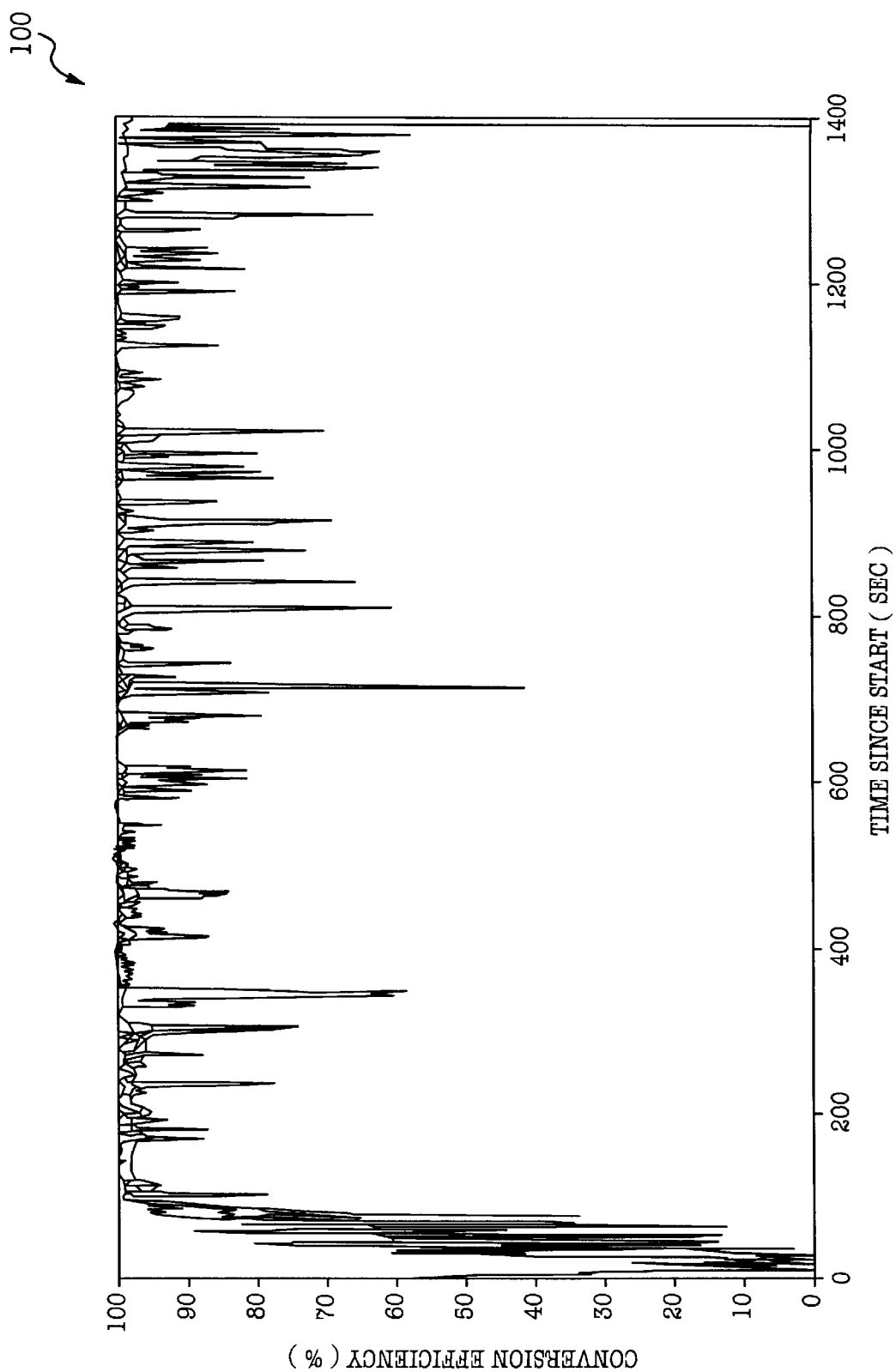
FIG. 5 is a graph illustrating the catalytic converter efficiency of a conventional vehicle during a standard emissions test.
Figure 6:
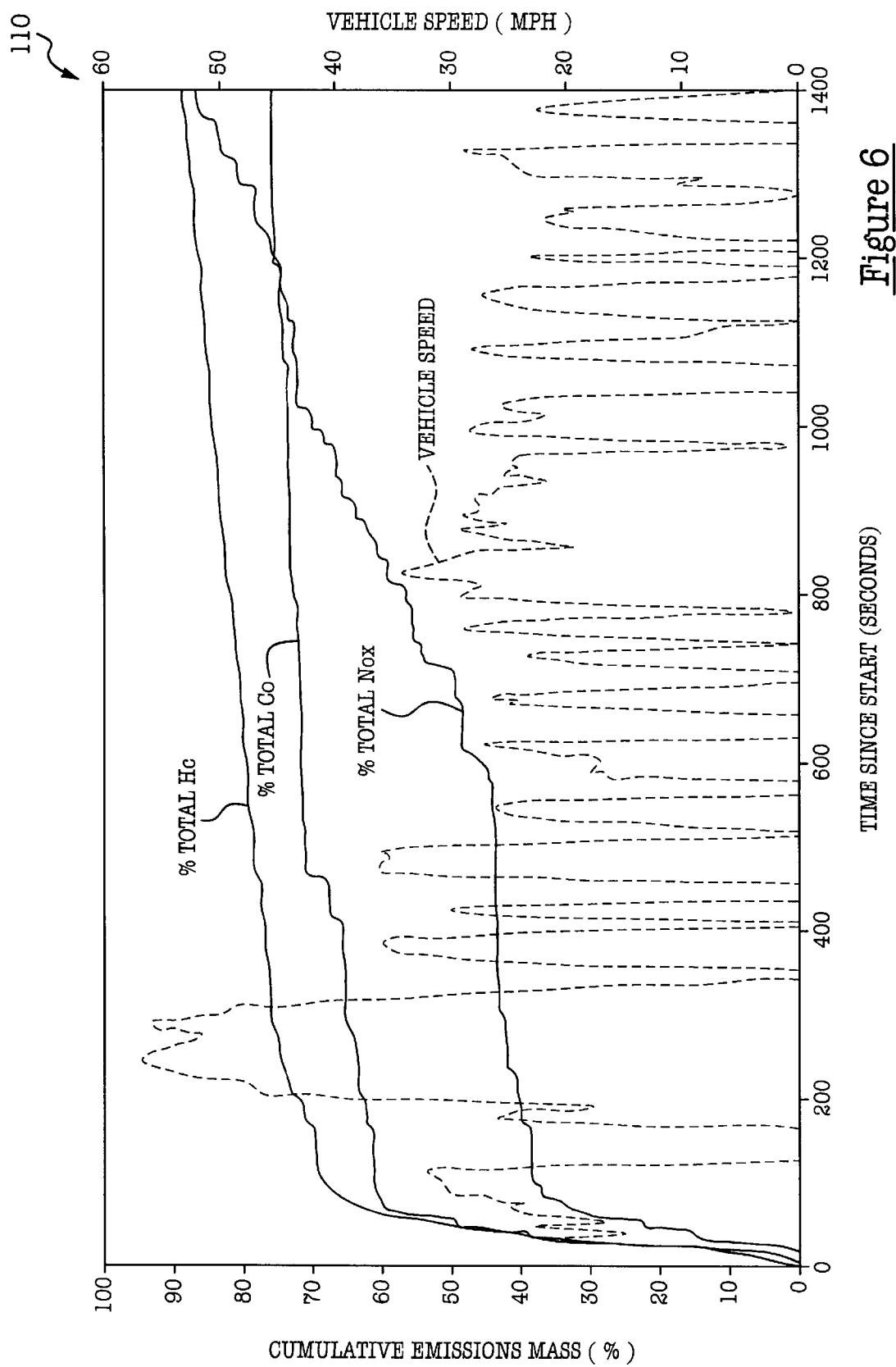
FIG. 6 is a graph illustrating the percentage of tailpipe emissions for a conventional vehicle during a standard emissions test.

As the load and power output of engine 16 is increased, controller 20 causes a relatively lean air-fuel ratio to be provided to engine 16, as shown in step 50. This relatively lean air-fuel ratio compensates for the increase in mass flow to the catalytic converter by reducing the HC concentration of the engine exhaust gasses, thereby reducing the potential for harmful emissions while the catalytic converter 28 is operating at a relatively low efficiency. In the preferred embodiment of the invention, controller 20 also alters the spark timing of engine 16 during the cold-start period. Particularly, controller 20 retards the spark timing of the engine to further reduce emissions during the cold-start period. In one non-limiting embodiment, controller 20 retards the spark timing in the range of approximately 10 degrees away from top-dead-center to approximately 30 degrees away from top-dead-center. It should be appreciated that the artificially increased engine load provided by the present strategy 40 allows the spark timing of engine 16 to be retarded to a greater degree relative to prior emission reduction strategies. Particularly, the increased engine load substantially reduces the occurrence of engine and/or combustion instability which may accompany relatively high degrees of spark retardation. Examples of various spark calibrations and the resulting cumulative HC emissions for a vehicle employing the present strategy during cold start idle loads are illustrated in graph 90 of FIG. 4.

Controller 20 continues to monitor the temperature of the engine 16 and catalytic converter 28 throughout the cold-start period (e.g., by use of sensors 24). In step 54, once the temperature of the engine 16 or the catalytic converter 28 exceed a predetermined threshold value, controller 20 generates command signals to motor/generator 12 and engine 16, effective to respectively terminate the negative torque provided by motor/generator 12 and the retarded spark calibration of engine 16. The predetermined threshold temperature value corresponds to the temperature that the catalytic converter 28 begins to operate at a certain calibratable efficiency percentage, and may be based on the specific type of catalyst used within catalytic converter 28. In one non-limiting embodiment the calibratable efficiency percentage is ninety percent (90%).

Controller 20 continues to monitor the vehicle's operating conditions for transient torque and/or speed events. In step 56, controller 56 detects any such events by monitoring controls 20 and sensors 24. In the preferred embodiment of the invention, controller 20 is able to detect a significant transient event by monitoring the load of engine 16 and if the demanded and/or generated engine load varies by more than a predetermined threshold value within a predetermined period of time, controller 20 determines that a significant transient event has occurred. The amount of the predetermined load variance and time period thresholds may be based upon the particular size and type of engine used. Controller 20 may also detect other types of engine operating conditions or events which produce significant amounts of emissions. In one non-limiting embodiment, controller 20 monitors the temperature of the catalyst for a range of temperatures which correspond to significant HC and CO emissions. This range of temperatures typically occurs after the catalyst efficiency has reached approximately fifty percent (50%), but before maximum efficiency is attained.

Upon detection of a transient event, controller 20 proceeds to step 58 and uses the motor/generator 12 to provide a positive torque to the drive train 18, thereby augmenting the torque provided by engine 16 and reducing the load on engine 16. Particularly, when a transient event is detected (e.g., when the demanded engine load exceeds the predetermined threshold), controller 20 communicates a signal to motor/generator 12 effective to cause motor/generator 12 to provide a positive torque to the drive train 18. This positive torque augments the torque provided by engine 16, thereby reducing the load on engine 16 and the resulting mass flow so that fewer emissions pass through the catalyst untreated. Additionally, this positive torque allows the air-fuel ratio to be held much closer to an ideal value during the transient events so that the catalyst is substantially at its best operating condition because the fuel metering control is not required to match as large of air mass charges. In the preferred embodiment, controller 20 gradually lowers the torque supplied by the motor/generator 12, effective to slowly increase the power demand of the engine 16, thereby allowing the air-fuel ratio to be maintained much closer to stoichiometric proportions. Controller 20 commands a slower changing engine power level by using motor/generator 12, which has a relatively fast response, to supply the demanded power that is in excess of the engine-produced power. The electrical energy used to augment the engine-produced torque is supplied to battery 14, in part, during the initial cold-start period, where motor/generator 12 is in regenerative mode.

In one non-limiting embodiment, when a transient event is detected, controller 20 partitions or allocates the requested torque between motor/generator 12 (i.e., the motor-produced torque) and engine 16 (i.e., the engine-produced torque) based upon the value of the transient torque demand. In the preferred embodiment, controller 20 begins by allocating the majority of the transient torque demand to motor/generator 12. Controller 20 then slowly raises the engine-produced torque while concomitantly lowering the motor-produced torque. This greatly reduces the amount of untreated emissions discharged during transient events, and also provides a smoother and more responsive performance. Controller 20 may perform similar strategies during other significant emissions-producing events, such as during the period of time after the catalyst efficiency has reached fifty percent (50%), but before the catalyst has reached maximum efficiency. Once controller 20 has reduced the supplemental motor-produced torque to about zero, as shown in step 60, the emissions reducing strategy 40 ends. Controller 20 will repeat steps 56–60 upon detection of another transient event.

It should be understood that Applicant's invention is not limited to the exact method 40 which has been described herein, but that various changes and/or modifications may be made without departing from the spirit and/or the scope of Applicant's invention. For example and without limitation, method 40 may include different or additional steps and may perform the disclosed steps and/or other steps in a different order or manner.

What is claimed is:

1. A method of operating a hybrid electric vehicle having a drive train, the drive train having an internal combustion engine and electric machine coupled thereto, the internal combustion further being coupled to a catalytic converter, the method comprising:

detecting a temperature of the internal combustion engine;

detecting a temperature of the catalytic converter;

detecting an engine cold-start condition if the temperature of the internal combustion engine is less than a predetermined engine temperature threshold;

determining a negative torque value based one or both of the temperature of the internal combustion engine and the temperature of the catalytic converter;

controlling the electric machine according to the negative torque value to apply a negative torque to the internal combustion engine, thereby increasing a power output of the internal combustion engine and the temperature of the catalytic converter;

while applying the negative torque, operating the internal combustion engine using a lean air-fuel ratio and retarded spark timing; and once the temperature of the catalytic converter exceeds a predetermined catalytic converter temperature threshold, controlling the electric machine to terminate the negative torque applied to the internal combustion engine, and controlling the internal combustion engine to terminate the retarded spark operation thereof, wherein the predetermined catalytic converter temperature threshold corresponds to operation of the catalytic converter at or above a predetermined calibratable efficiency percentage of the catalytic converter.

2. The method according to claim 1, wherein the retarded spark timing is within the range of approximately 10 degrees away from top-dead-center to approximately 30 degrees away from top-dead-center.

3. The method according to claim 1, wherein the predetermined calibratable efficiency percentage of the catalytic converter is ninety percent.

* * * * *